US008028415B2

(12) United States Patent
Clark

(10) Patent No.: US 8,028,415 B2
(45) Date of Patent: Oct. 4, 2011

(54) METHOD OF INSTALLING A PINION SEAL TO A CARRIER/BEARING CAGE AND AN AXLE

(75) Inventor: Keith Clark, Rumney, NH (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 0 days.

(21) Appl. No.: 12/705,649

(22) Filed: Feb. 15, 2010

(65) Prior Publication Data

US 2010/0139096 A1    Jun. 10, 2010

Related U.S. Application Data

(62) Division of application No. 10/553,590, filed on Oct. 25, 2006.

(60) Provisional application No. 60/463,293, filed on Apr. 16, 2003.

(51) Int. Cl.
*B21D 53/10* (2006.01)
*F16J 15/02* (2006.01)

(52) U.S. Cl. .............. 29/898.11; 29/898.08; 29/898.09; 29/888.3; 29/434; 277/551; 277/572

(58) Field of Classification Search ............... 29/898.11, 29/898.07, 898.08, 898.09, 898.1, 888.3, 29/434; 277/309, 549, 551, 562, 571, 572, 277/573, 576, 577
See application file for complete search history.

(56) References Cited

U.S. PATENT DOCUMENTS

| 3,021,161 | A | * | 2/1962 | Rhoads et al. ............... 277/568 |
| 3,135,518 | A | | 6/1964 | Carson et al. |
| 4,136,885 | A | | 1/1979 | Uhrner |
| 4,327,922 | A | | 5/1982 | Walther |
| 4,428,586 | A | | 1/1984 | Romero |
| 4,448,426 | A | | 5/1984 | Jackowski et al. |
| 4,856,794 | A | | 8/1989 | Boyers et al. |
| 5,096,207 | A | | 3/1992 | Seeh et al. |
| 5,186,472 | A | | 2/1993 | Romero et al. |
| 5,201,529 | A | | 4/1993 | Heinzen |
| 5,269,536 | A | | 12/1993 | Matsushima et al. |
| 5,387,039 | A | * | 2/1995 | Bien ............................ 384/477 |
| 6,083,109 | A | | 7/2000 | Gerulski |
| 6,170,992 | B1 | | 1/2001 | Angelo et al. |
| 6,729,623 | B2 | | 5/2004 | Visconti |

\* cited by examiner

*Primary Examiner* — Sarang Afzali
(74) *Attorney, Agent, or Firm* — Ronald W. Wangerow, Esq.; Harness, Dickey & Pierce, P.L.C.

(57) ABSTRACT

A unitized pinion seal assembly has a seal portion and a sleeve portion that are assembled in an interference fit relationship. The unitized pinion seal assembly is assembled to a carrier bearing cage and an axle companion flange with proper spacing between non-sealing components, and without a spacer mounted between the two portions.

1 Claim, 4 Drawing Sheets

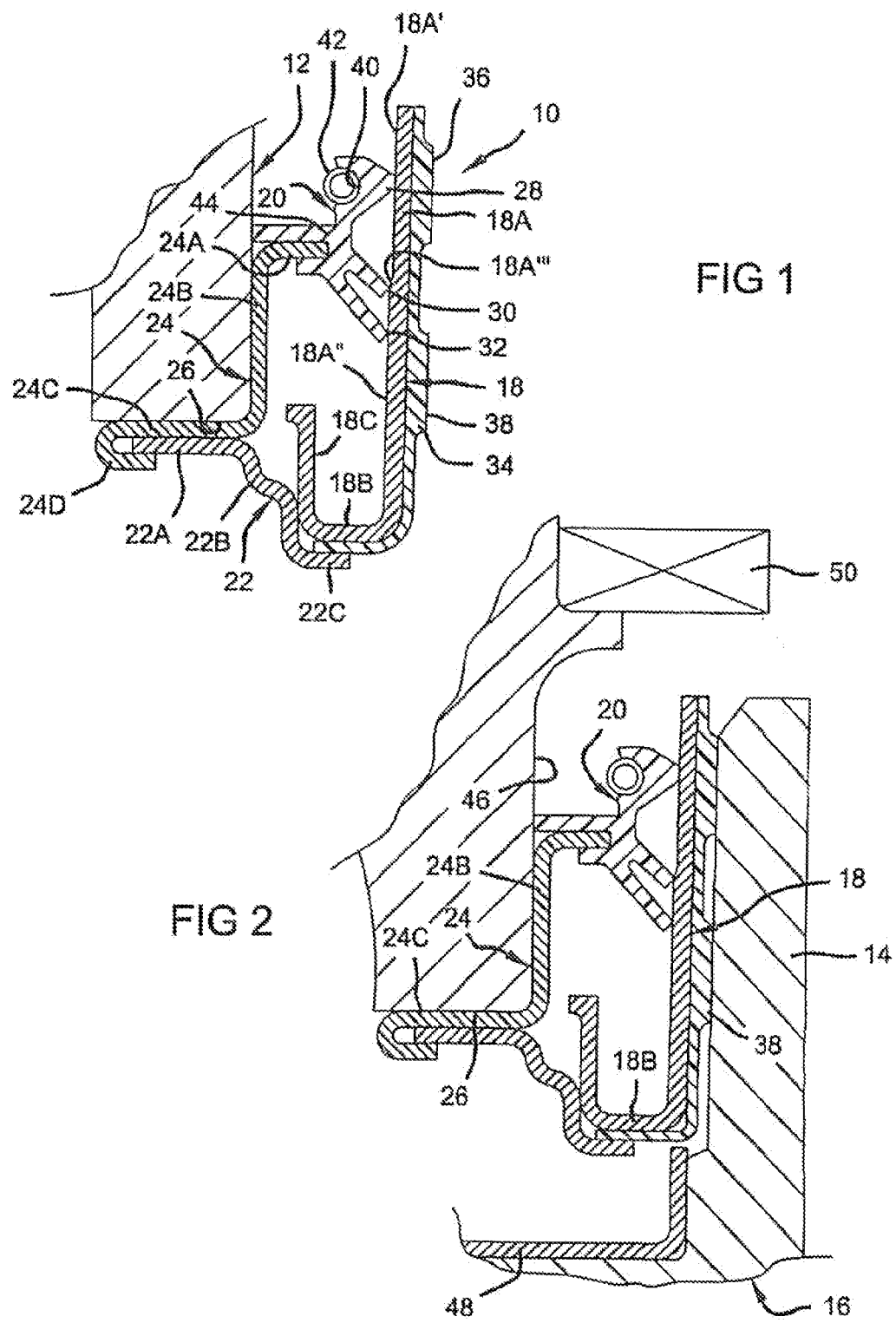

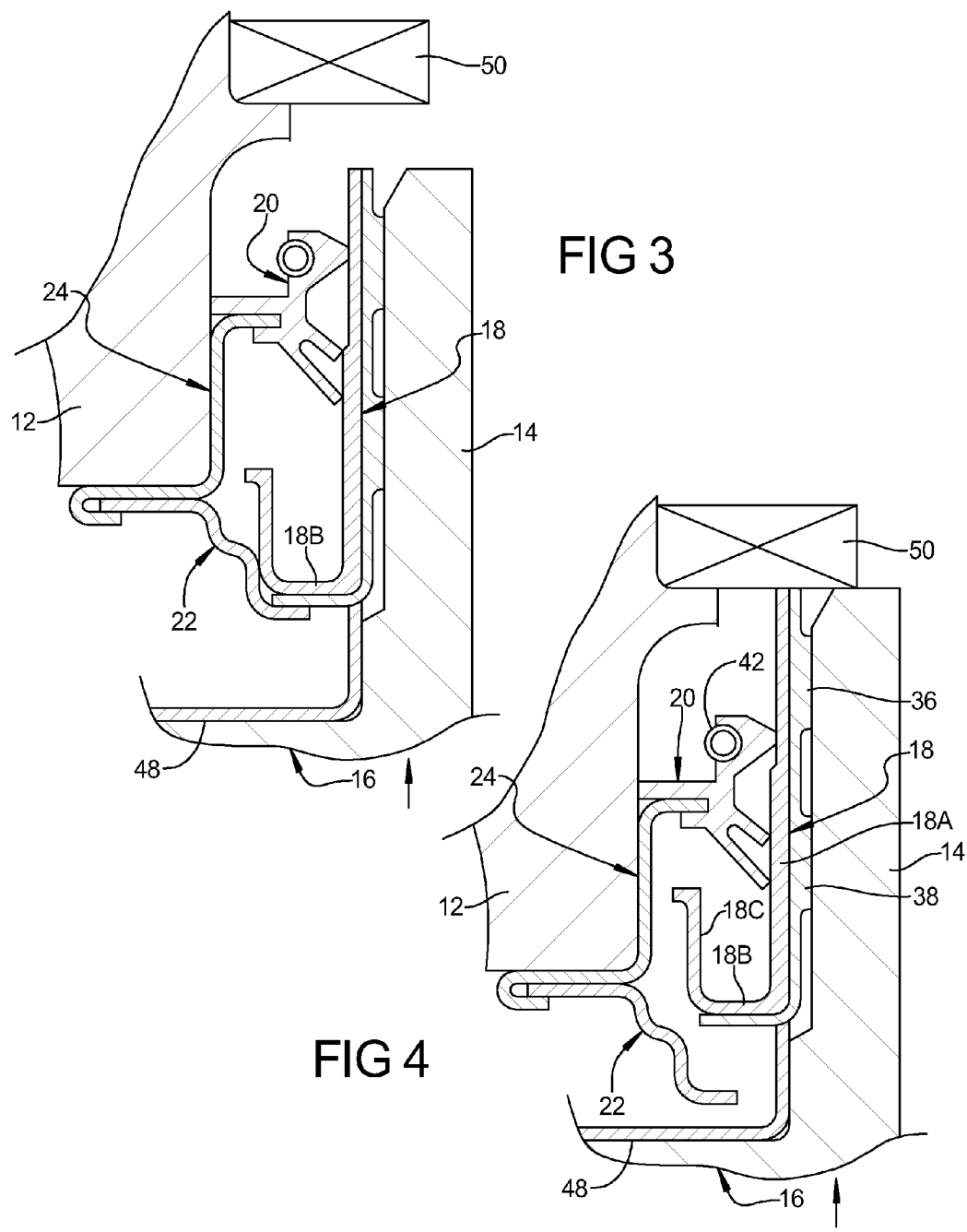

METHOD OF INSTALLING A PINION SEAL TO A CARRIER/BEARING CAGE AND AN AXLE

CROSS-REFERENCE TO RELATED APPLICATIONS

This application is a divisional of U.S. patent application Ser. No. 10/553,590, filed on Oct. 25, 2006, now U.S. Pat. No. 7,712,745, which is a National Stage of International Application No. PCT/US2004/011987, filed Apr. 16, 2004, which claims the benefit of U.S. Provisional Application Ser. No. 60/463,293, filed Apr. 16, 2003. The entire disclosures of each of the above applications are incorporated herein by reference.

FIELD

The present disclosure relates in general to seals and, more particularly, to a pinion seal used to seal about an axle pinion.

BACKGROUND

This section provides background information related to the present disclosure which is not necessarily prior art.

During assembly of an axle, a pinion seal is assembled between an axle companion flange and a carrier/bearing cage. The pinion seal includes a sleeve portion, which is mounted to and rotates with the axle companion flange, and a seal portion, which is mounted to and is stationary with the carrier/bearing cage. The two end up, then, in sliding engagement at seal contact locations. This requires an axial spacing between certain portions of the two components to assure that the only contact is at the seal contact locations. Thus, in order to accomplish the proper installation of the sleeve portion and seal portion, a contacting spacer is typically employed between the sleeve and the seal. This is particularly true if one attempts to assemble the two portions as a single unit. However, a contacting spacer located between the seal and sleeve components will generally cause, higher torque loss, additional noise, and increased heat generation due to the additional friction between components.

Also, during assembly, since the sleeve portion and the seal portion are typically assembled separately, this may allow contamination to enter the seal. Consequently, it is desirable to have a unitized seal where the two portions can be assembled as one. Being able to assemble the pinion seal as a unitized assembly would also be desirable in order to improve the assembly process.

Thus, it is desirable to have a unitized pinion seal for axle pinion applications that can be assembled as a unit and have a bearing configuration suitable for supporting and spacing the stationary (seal) and rotating (sleeve) components during assembly of the axle.

SUMMARY

This section provides a general summary of the disclosure, and is not a comprehensive disclosure of its full scope or all of its features.

In its embodiments, the present invention contemplates a unitized pinion seal as shown and described herein.

The present invention further contemplates a method of assembling a unitized pinion seal to a carrier/bearing cage and an axle companion flange as shown and described herein.

An advantage of an embodiment of the present invention is that the unitized seal design will shield the critical areas of the seal during installation, which minimizes the chance for receiving contamination in or damage to critical areas of the seal. Moreover, by shielding the critical areas of the seal, a ground surface finish for the mating components may not be required.

Another advantage of an embodiment of the present invention is that the unitized design allows for assembly of both portions of the seal simultaneously without requiring a contact spacer to be mounted between the seal and sleeve components. The elimination of the spacer will reduce torque loss, minimize the noise, and decrease heat generation by reducing the friction between components. Yet, when assembled onto the axle, the seal allows for the required axial spacing between the rotating and stationary portions of the seal A further advantage of an embodiment of the present invention is that the assembly of the unitized design, without spacers, does not require special assembly methods in order to provide the required spacing between components.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

The present invention will become more fully understood from the detailed description and the accompanying drawings, wherein:

FIG. 1 is a cross sectional view of a pinion seal assembly according to the principles of the present invention, installed in a carrier/bearing cage bore, but before assembly onto an axle flange;

FIG. 2 is a view similar to FIG. 1 but illustrating the pinion seal assembly as it begins to be installed on the axle flange;

FIG. 3 is a view similar to FIG. 2, but illustrating the pinion seal assembly assembled further onto the axle flange;

FIG. 4 is a view similar to FIG. 3, but illustrating the pinion seal assembly completely assembled onto the-axle flange;

Corresponding reference numerals indicate corresponding parts throughout the several views of the drawings.

DETAILED DESCRIPTION

Figure 5:
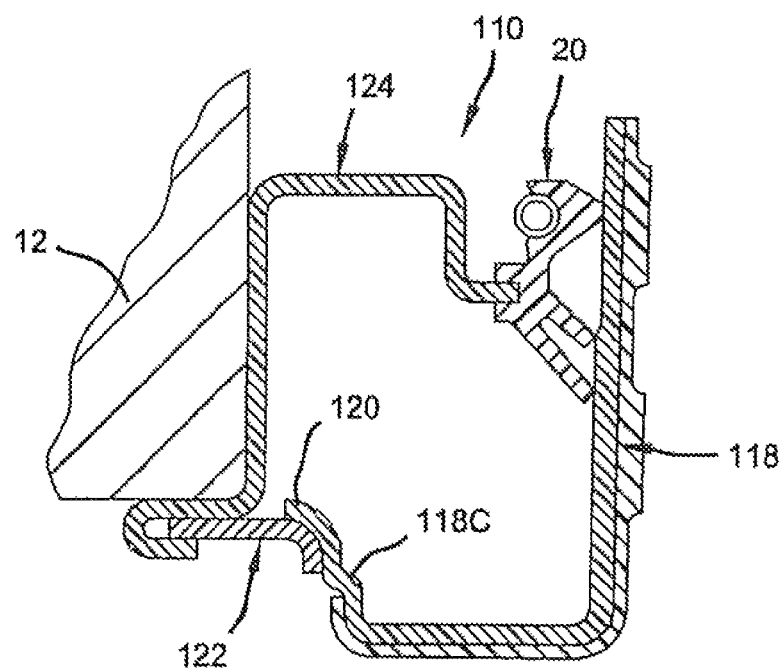
FIG. 5 is a cross-section of a second embodiment of the pinion seal assembly according to the principles of the present invention.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The following description of the preferred embodiment(s) is merely exemplary in nature and is in no way intended to limit the invention, its application, or uses.

With reference to FIGS. 1-4, a pinion seal assembly 10 is shown at four different stages of being assembled to a carrier/bearing cage 12 and a companion flange 14 of an axle 16 (FIG. 2). The pinion seal assembly 10 is preassembled and includes a sleeve portion 18 slidably engaging a seal portion 20 and a first retainer ring 22. A second retainer ring 24 engages a shoulder 26 on the carrier/bearing cage 12 and engages the first retainer ring 22 as well as the seal portion 20. The pinion seal assembly 10 is preassembled with the sleeve portion 18, seal portion 20, first retainer ring 22, and second retainer ring 24 all engaged as will be described in greater detail herein. The preassembly is done prior to installation of the pinion seal assembly 10 onto the axle 16. Since the components of the pinion seal assembly 10 are already assembled, the internal area between the sleeve portion 18 and seal portion 20 including seal lips 28, 30, 32 will not be exposed during assembly on the axle 16. Thus, the chance of contaminants entering or interfering with the seal lips 28, 30, 32 is greatly reduced.

The sleeve portion 18 is ring shaped with a generally 3-shaped cross-section having a first axially extending ring portion 18A, a radially extending ring portion 18B, and a second axially extending ring portion 18C. The first axially extending ring portion 18A and radially extending ring portion 18B are covered with an elastomeric seal layer 34 including a pair of raised rib portion 36, 38. An outer surface of the first axially extending ring portion 18A of sleeve portion 18 includes a first portion 18A' having a first predetermined diameter and a second rearward portion 18A" having a larger diameter than the forward portion 18A' with a ramp portion 18A''' being disposed therebetween. It should be understood that other configurations of the sleeve can be utilized. The seal rings 36, 38 of the sleeve portion 18 are adapted to engage the companion flange 14 of the axle 16 in the assembled condition.

The seal portion 20 is provided with the first, second, and third seal lips 28, 30, 32. The seal portion 20 has a recessed region 40 disposed in the vicinity of the first seal lip 28. The recessed portion 40 is adapted to receive a garter spring 42 therein for applying a radially inward force to the seal portion 20. The seal portion 20 includes a body portion 44 which engages a first radially inwardly extending flange portion 24A of the second retainer ring 24. The second retainer ring 24 includes a second axially extending ring portion 24B and a third radially outwardly extending flange portion 24C which has an end portion 24D which is crimped around a radially outwardly extending flange portion 22A of the first retainer ring 22. The first retainer ring 22 also includes an axially extending ring portion 22B having an inner diameter surface which engages the second axially extending ring portion 18C of sleeve portion 18. The first retainer ring 22 includes a radially inwardly extending flange portion 22C which engages the radially extending ring portion 18B of sleeve portion 18 as illustrated in FIGS. 1-3.

With reference to FIG. 2, the pinion seal assembly 10 is inserted into a bore 46 such that the seal portion 20 and axially extending ring portion 241 of the second retainer ring 24 are received in and engage the bore 46. The radially outwardly extending flange portion 24C of the second retainer ring 24 engages shoulder 26 of carrier/bearing cage. As shown in FIG. 2, the axle companion flange 14 of axle 16 is inserted into the sleeve portion 18, with the inner diameter of the elastomeric seal 38 initially sliding along the companion flange 14 without an interference fit (as best seen in FIG. 2). With further insertion of the companion flange 14, a radial interference begins to develop between the companion flange 14 and the elastomeric seal 38. The seal 38 and sleeve portion 18 are sized and shaped so that a radial interference condition develops between the seal 38 and the companion flange 14 as the companion flange 14 slides farther into the sleeve portion 18. The interference-condition between the sleeve portion 18 and the companion flange 14 might be designed to occur at any location on the flange 14, or any other component that is assembled to it that is stationery with respect to the flange 14, such as a flange deflector. With further insertion of the companion flange 14, an axial interference condition develops between a deflector 48 and the sleeve 18 (the sleeve abuts the deflector). The axial interference condition between the sleeve 18 may be designed to occur at any location on the deflector 48, flange 14, or any other component that is assembled to and is stationary with respect to the flange 14. The axial interference condition developed prevents further sliding motion between the sleeve 18 and companion flange 14 and is designed to occur before the companion flange 14 abuts the bearing 50. Further installation of the companion flange 14 then causes the sleeve 18 to disengage the first assembly ring 22 before the companion flange 14 reaches the final assembled position, abutting bearing 50 (best seen in FIG. 4).

The deflector 48 is provided on axle 16 and eventually abuts against the radially extending ring portion 18B of sleeve portion 18, as best seen in FIG. 3. The final radial interference fit, after being fully installed, holds the sleeve portion 18 stationary relative to the companion flange 14 during operation of the axle 16.

The axial retention level due to the press fit of the sleeve portion 18 onto the first retainer ring 22 is preferably greater than the axial installation load created when the axle companion flange 14 is inserted through the inner diameter of the sleeve portion 18. As a result, the seal portion 20 remains generally stationary relative to the sleeve portion 18 during the initial part of the installation.

In the completed assembly, the companion flange 14 is fully assembled relative to the carrier/bearing cage 12, with the second retainer ring 24 fully assembled to the carrier/bearing cage 12 and the sleeve portion 18 fully assembled to the companion flange 14 of axle 16 such that a proper axial spacing exists between the seal portion 20 and the sleeve portion 18. During operation, the sleeve portion 18 can rotate with the companion flange 14, while the seal portion 20 remains stationary with the carrier/bearing cage 12, with the only contact between the two being sealing lips 28, 30, 32. Thus, the proper sealing is assured while minimizing the friction between the two portions of the pinion seal assembly 10.

Figure 6:
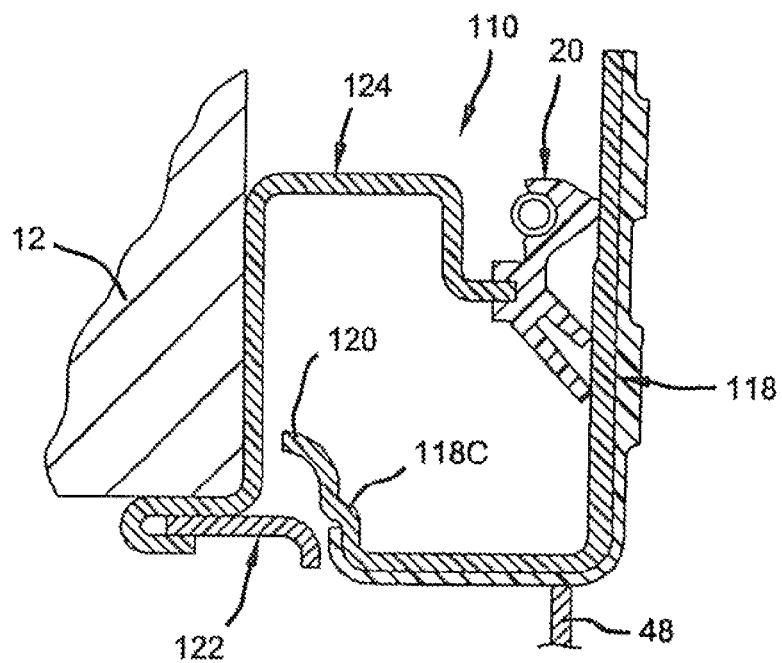
FIG. 6 is a cross-section of the pinion seal of FIG. 5 shown in a fully assembled condition.

FIGS. 5 and 6 illustrate an alternate embodiment of the pinion seal assembly 110. In this embodiment, the sleeve portion 118 is modified to include a radially outwardly extending flange 120 extending from the second axially extending ring portion 118 such that the flange portion 120 engages the first retainer ring 122. In this embodiment, the first retainer ring 122 does not include a radially inwardly extending flange portion such as radially inwardly extending flange portion 22C of the first retainer ring 22 disposed in the embodiment shown in FIGS. 1-4. In addition, the shape of the second retaining ring 124 has also been changed in order to demonstrate the differing configurations that can be utilized. As illustrated in FIG. 6, the pinion seal assembly 110 is shown in a fully assembled condition such that the sleeve portion 118 is moved axially relative to the seal portion 20. Although the shape and configuration of some of the components are different, the installation process and resulting axial spacing for the pinion seal assembly 110 are the same as in the first embodiment as described above with reference to FIGS. 1-4.

Figure 7:
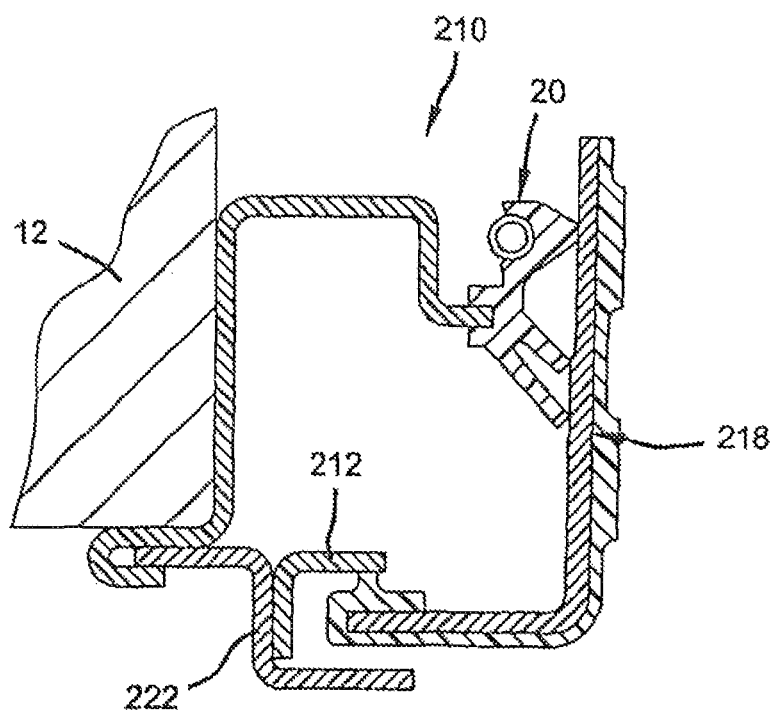
FIG. 7 is a cross-section of a third embodiment of the pinion seal assembly according to the principles of the present invention.

With reference to FIG. 7, an additional alternative embodiment of the pinion seal assembly 210 is shown. In this embodiment, the pinion seal assembly 210 includes a separate component 212 that supports the sleeve portion 218 during the initial phase of the installation. After the axial interference condition between the sleeve portions 218 and companion flange (not shown in FIG. 7) develops, the separate component 212 preferably disengages from the first retainer ring 222 or sleeve portion 218 due to the further axial motion of the companion flange. The component 212 then becomes spaced from the portion from which it separated, which can be due to gravity, springs, separation of press-fit components, or similar means.

Figure 8:
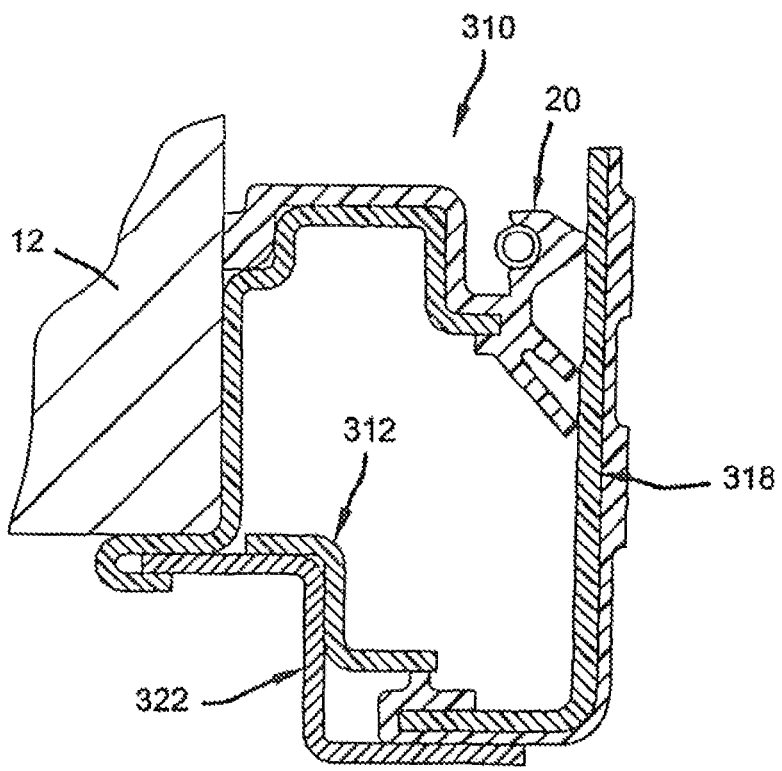
FIG. 8 is a cross-section of a fourth embodiment of the pinion seal assembly according to the principles-of the present invention.

With reference to FIG. 8, a fourth embodiment of the pinion seal assembly 310 is provided. In this embodiment, the pinion seal assembly 310 includes a separate component 312 that supports the sleeve portion 318 during the initial phase of the installation. After the axial interference condition between the sleeve portion 318 and companion flange (not shown) develops, the separate component 312 preferably disengages from either the first retainer ring 322 or sleeve portion 318 due to the further axial motion of the companion flange. The component 312 then becomes spaced from the portion from which it separated, which can be due to gravity, springs, separation of press-fit components or similar means.

The description of the invention is merely exemplary in nature and, thus, variations that do not depart from the gist of the invention are intended to be within the scope of the invention. Such variations are not to be regarded as a departure from the spirit and scope of the invention.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A method of installing a pinion seal to a carrier/bearing cage and an axle companion flange, the method comprising the steps of:
    assembling a sleeve of the pinion seal to a retainer of the pinion seal with a radial interference fit between cooperating axially extending portions of said sleeve and said retainer, said retainer supporting a seal in engagement with said sleeve;
    assembling the pinion seal to the carrier/bearing cage;
    partially installing the axle companion flange into the sleeve while generating less axial installation force between the axle companion flange and the sleeve than an axial retention load created by the interference fit between the retainer and the sleeve wherein an initial axial movement of the companion flange relative to the sleeve occurs during partial installation of the axle companion flange; and
    further installing the axle companion flange into a bore of the carrier/bearing cage while preventing further axial movement of the companion flange relative to the sleeve, to thereby overcome the axial retention load and move the sleeve axially relative to the seal and out of radial interference fit with said retainer.

* * * * *

UNITED STATES PATENT AND TRADEMARK OFFICE
CERTIFICATE OF CORRECTION

PATENT NO. : 8,028,415 B2  
APPLICATION NO. : 12/705649  
DATED : October 4, 2011  
INVENTOR(S) : Keith Clark Page 1 of 1

It is certified that error appears in the above-identified patent and that said Letters Patent is hereby corrected as shown below:

Title Page, Items (62) and (60) Related U.S. Application Data,

The Priority Data should be listed as:

Division of application No. 10/553,590, filed on Oct. 25, 2006, now Pat. No. 7,712,745, which is a 371 of PCT/US2004/011987, filed on Apr. 16, 2004.

Provisional application No. 60/463,293, filed on Apr. 16, 2003.

Signed and Sealed this
Twenty-second Day of November, 2011

David J. Kappos
*Director of the United States Patent and Trademark Office*